United States Patent Office 3,705,073
Patented Dec. 5, 1972

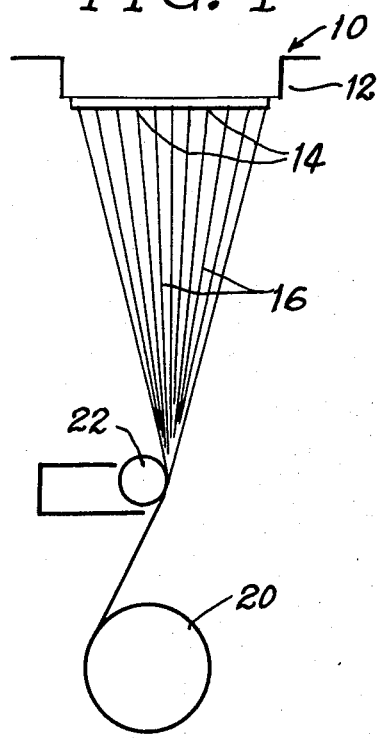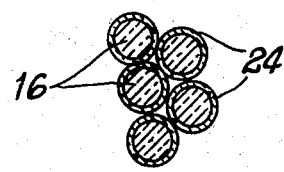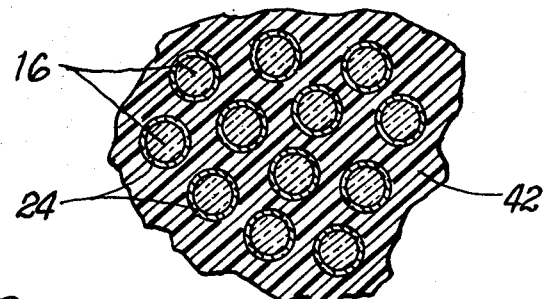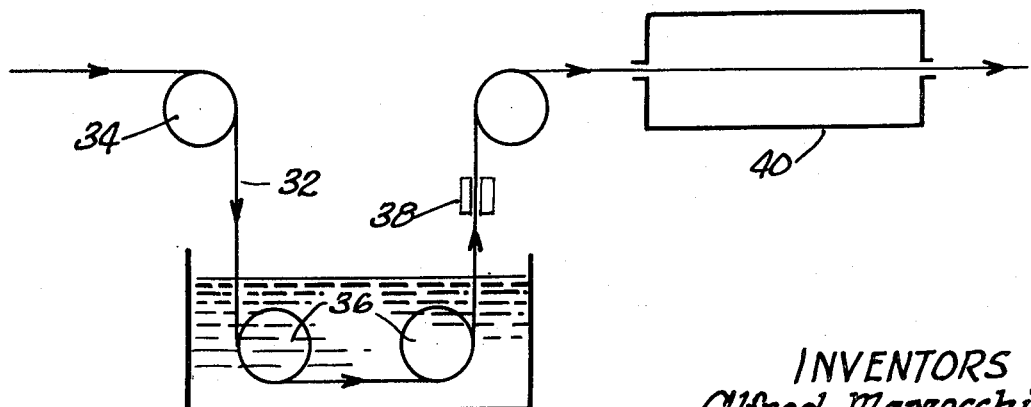

3,705,073
GLASS FIBER BUNDLE COMPRISING AN ELASTOMER COMPATIBLE IMPREGNANT AND A THICKENING AGENT
Alfred Marzocchi, Cumberland, and Nicholas S. Janetos, East Providence, R.I., assignors to Owens-Corning Fiberglas Corporation, Toledo, Ohio
Filed May 26, 1970, Ser. No. 40,622
Int. Cl. C03c 25/02; B32b 17/04, 17/10
U.S. Cl. 161—176      5 Claims

ABSTRACT OF THE DISCLOSURE

This invention is addressed to the improvement in the bonding relationship between glass fibers and elastomeric materials when the glass fibers are combined with elastomeric materials in the manufacture of glass fiber-reinforced elastomeric products wherein individual glass fibers are sized, or a bundle of glass fibers is impregnated with an elastomer compatible material which has been rendered thixotropic by the addition thereto of a thickening agent.

---

This invention relates to elastomeric products reinforced or otherwise combined with glass fibers and it relates more particularly to the method and compositions employed in the treatment of the glass fibers to enhance the bonding relationship between the glass fibers and the elastomeric materials for making fuller utilization of the desirable characteristics of the glass fibers in their combination with the elastomeric materials.

The term "glass fibers," as used herein, shall refer to (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strand, yarn, cord and fabrics formed thereof.

As used herein, the term "elastomer" is meant to include natural rubber in the cured or uncured stage, vulcanized or unvulcanized stage, and synthetic organic elastomeric materials such as butadiene-styrene copolymer, butadiene-acrylonitrile copolymer, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monoolefin having from 3–20 carbon atoms, such as propylene, and a polyene, such as dicyclopentadiene, 1,4-hexadiene and preferably an alkylene or alkylidene norbornene, such as 5-alkylidene-2-norbornene and the like in which the alkylidene group numbers from 2–12 carbon atoms, and polysulfone rubber.

The invention is addressed to the fuller utilization of the desirable characteristics of glass fibers, such as their high strength, flexibility, thermal stability, chemical stability, inertness, electrical resistance and heat conductive characteristics when used in combinations with elastomeric materials as a reinforcement or as a stabilizing agent in belt manufacture, as reinforcing cords and fabrics to increase strength, life, wearability, and service characteristics in rubber tires, and as a reinforcement and the like in other elastomeric coated fabrics and molded elastomeric products.

It is an object of this invention to provide a new and improved composition which may be used as a forming size for treatment of glass fibers in forming or preferably as an impregnating composition for treatment, in forming or afterwards, of bundles, yarns, cords, strands and fabrics formed of glass fibers to enable fuller utilization to be made of the desirable characteristics of the glass fibers when used in combination with elastomeric materials in the manufacture of glass fiber reinforced molded products and coated fabrics.

More specifically, it is an object of this invention to provide a composition for use in the treatment of glass fibers in forming to improve the processing and the performance characteristics of the glass fibers as a reinforcement for elastomeric materials and for use in the treatment of bundles, strands, yarns, cords and fabrics of glass fibers, in forming or afterwards, to enhance their bonding relationship when used in combination with elastomeric materials in the manufacture of glass fiber reinforced plastics, laminates or coated fabrics and it is a related object to provide a method and means for making fuller utilization of the strength properties of glass fibers when used as a reinforcement for elastomeric materials.

These and other objects and advantages of this invention will hereinafter appear and, for purposes of illustration, but not of limitation, an embodiment of the invention is shown in the accompanying drawing in which:

FIG. 1 is a flow diagram showing the manufacture of continuous glass fibers and the treatment thereof in forming to improve the processing characteristics of the glass fibers and to improve the performance characteristics of the glass fibers when used in combination with elastomeric materials in the manufacture of glass fiber reinforced elastomeric products;

FIG. 2 is a flow diagram illustrating the treatment of glass fibers subsequent to their being formed into bundles, strands, yarns, cords or fabrics to impregnate the glass fiber bundles in accordance with the practice of this invention;

FIG. 3 is a cross-sectional view of glass fibers processed in accordance with the diagram illustrated in FIG. 1; and FIG. 4 is a cross-sectional view of a bundle of glass fibers processed in accordance with the flow diagram of FIG. 2.

To the present, glass fibers which have been added or otherwise incorporated with elastomeric materials, in the form of continuous or chopped fibers, have functioned more or less as a filler than as a reinforcement, or flexibilizing agent, or stabilizing agent. As a result, little, if any, improvements in mechanical and physical properties have been made available from the combinations which made use of glass fibers in products formed of elastomeric materials. It is believed that the failure to make fuller utilization of some of the more desirable properties of the glass fiber components resides in the inability properly to integrate the glass fibers with the elastomeric system.

Investigations have been conducted over the past several years by the most highly skilled in the art in the attempt to make fuller utilization of the glass fiber components formulated into elastomeric materials in the endeavor to fabricate products having new and improved physical and mechanical properties. Substantial inroads are now being made as represented by the practice of this invention, as will hereinafter be described.

In copending application Ser. No. 398,305, filed Sept. 22, 1964, description is made of a method and composition for treating glass fibers wherein individual glass fibers are sized, or a bundle of glass fibers is impregnated with an elastomer compatible material in the form of a natural rubber latex-resorcinol aldehyde resin (hereinafter referred to as RFL). The RFL system as disclosed in the aforementioned copending application has the disadvantage that the amount of RFL applied to or loaded on the glass fibers is limited, when applied as a size, by the tendency of the RFL to be dislodged or thrown from the glass fibers as they are formed during the glass fiber forming operation or when applied as an impregnant to bundles of glass fibers, by the tendency of the RFL impregnant to be dislodged from the glass fiber bundle when the glass fiber bundle is subjected to a change in direction, as when the bundle is passed over a roller.

It has now been found that the tendency of RFL, and other basic elastomer compatible systems, to be dislodged from glass fiber surfaces can be significantly decreased and that the ability to obtain higher loading of RFL and like sizes and/or impregnants can be increased by utilizing an elastomer compatible material admixed with a thickening agent to provide an elastomer compatible material having thixotropic properties. Thixotropic compositions of the present invention may be applied to individual glass fibers as a size in forming, or subsequently after an originally applied size has been removed, or an impregnant for bundles of glass fibers, which may or may not contain a thin size coating on the surfaces of the individual glass fibers. The thixotropic compositions of the present invention are applied to glass fibers while the composition is being subjected to stress, such as the agitation or by roller-applicator, to maintain the composition in a flowable condition during its application to the glass fibers. Thereafter, the thixotropic properties of the composition cause it to gel on the glass fibers thereby facilitating higher loading of the composition on the glass fibers or in glass fiber bundles and minimizing the tendency of the size or impregnant to be disturbed during forming and/or subsequent operations.

The invention will be described with reference to a new and improved composition which can be employed as an original size applied to the glass fibers in forming thereby individually to coat each of the glass fiber filaments subsequently formed into the strand, yarn, cord or fabric to provide both the desired processing and performance characteristics for processing the sized glass fibers in the formation of the strand and in the twisting and plying of the strands into yarns or cords and in the processing of the strands, yarns or cords into fabrics and the desired performance characteristics for enhancing the bonded relationship when the sized glass fibers are combined with elastomeric materials in the manufacture of reinforced elastomeric products.

In the preferred practice of this invention, the composition is formulated as an impregnating composition for treatment of strands, yarns, cords and fabrics formed of previously sized or unsized glass fibers for penetration of the treating composition into the strand, yarn, cord or fabric with the intention of individually coating the fibers to protect the fibers against destruction by mutual abrasion while establishing a bonded relatinship therewith or else penetrating the glass fiber strand, yarn, cord or fabric sufficiently to intertie the glass fiber system with the elastomeric materials with which the glass fibers are combined in the manufacture of glass fiber-elastomeric products.

The following examples will serve to illustrate the principal concepts of the invention in a composition for the treatment, as by impregnation, of yarns, cords, fabrics or bundles of glass fibers wherein the individual glass fibers may or may not have previously been sized in forming with a conventional size composition, which preferably have been modified to embody a glass fiber anchoring agent.

EXAMPLE 1

Forming size composition

| | Percent by wt. |
|---|---|
| Partially dextrinized starch | 8.0 |
| Hydrogenated vegetable oil | 1.8 |
| Cationic wetting agent (lauryl amine acetate) | 0.4 |
| Nonionic emulsifying agent | 0.2 |
| Gamma-aminopropyltriethoxy silane | 1.0 |
| Water | 88.6 |

EXAMPLE 2

Forming size composition

| | Percent by wt. |
|---|---|
| Saturated polyester resin | 3.2 |
| Fatty acid amine wetting agent (Nopcogen 16 L) | 0.1 |
| Polyvinyl alcohol | 0.1 |
| Pyrrolidine | 3.0 |
| Gamma-aminopropyltriethoxy silane | 0.3 |
| Glacial acetic acid | 0.1 |
| Water | 93.2 |

EXAMPLE 3

Forming size composition

| | Percent by wt. |
|---|---|
| Paraffin wax in aqueous emulsion | 0.2 |
| Cationic amide polyester resin | 1.3 |
| Polyglycol condensate (300 to 400 MW) | 2.3 |
| Gelatin | 0.25 |
| Gamma-aminopropyltriethoxy silane | 0.5 |
| Dibasic ammonium phosphate | 0.1 |
| Glacial acetic acid | 0.2 |
| Water | 95.15 |

Referring now to the schematic diagram of FIG. 1, the glass is melted in a glass melting furnace 10 having a bushing 12 on the bottom side. The bushing is formed with a plurality of openings extending therethrough and the molten glass flows gravitationally through the hundreds of small openings in the bushing to form therein streams 14 which are rapidly attenuated into fine glass filaments 16 by winding the filaments about a rapidly rotating drum 20. The filaments 16 are sized with one of the size composition of Examples 1–3 as they are gathered together to form a strand. For this purpose, use is made of an applicator 22 which is illustrated as a wiping pad that is constantly wet with the forming size composition. The filaments of glass are each wet with the size composition as they are gathered together to form the strand 18 that is wound about the drum 20.

The sized strands are allowed to air dry or drying of the thin size coating can be accelerated by exposure to elevated temperature such as a temperature within the range of 150° to 250° F. The applied size forms a very thin coating 24 on the surface of the glass fibers 16 to impart a desired balance of lubricity and bending without destroying the fibrous characteristic or appearance of the fiber.

The strand 18 of sized glass fibers is preferably plied with other strands and twisted to form yarns, threads, or cords which may be used as a reinforcement for elastomeric materials, with or without cutting to shorten lengths, and which can be formed into woven or non-woven fabrics for subsequent combination with elastomeric materials.

After the fibers have been processed into strands, yarns, cords or fabrics, hereinafter referred to generally as bundles, the bundles of sized glass fibers are impregnated with a composition embodying the features of this invention, as represented by the following examples.

However, it will be understood that the bundles of glass fibers processed in accordance with the concepts of the present invention need not contain a conventional size coating of the type illustrated by the Examples 1–3.

EXAMPLE 4

Impregnating composition

| | Percent by wt. |
|---|---|
| Natural rubber latex-resorcinol formaldehyde resin (38% solids-"Lotol") | 30.0 |
| Carboxymethyl cellulose ("Thixcin"-Baker Castor Oil Co.) | 6.0 |
| Water | 64.0 |

Impregnation of a bundle of glass fibers containing a thin size coating of one of Examples 1–3 with the aqueous composition of Example 4 can be made by conventional means for impregnation, such as by immersion of the bundles in a bath of aqueous impregnating composition while subjecting the composition to vigorous agitation to maintain the thixotropic composition in a flowable condition.

Referring more specifically to FIG. 2 of the drawing, the glass fiber bundle 32 is advanced over a guide roller 34 for passage downwardly into the bath 35 containing the impregnating composition of Example 4. The bundle is then turned under roller 36 to effect a sharp bend which operates to open the bundle to enable fuller penetration of the aqueous impregnating composition into the bundle of sized fibers for fuller impregnation of the bundle. The impregnated bundle is then raised from the bath for passage through a roller or die 38 which operates to remove excess impregnating composition from the bundle and to work the impregnating composition into the bundle. Thereafter the endless bundle is advanced over the roller 39 into a drying oven preferably in the form of an air drying oven maintained at a temperature within the range of 150° to 350° F. to accelerate removal of the aqueous diluent and to set the impregnating material in situ in the glass fiber bundle. Drying will occur in a relatively short period of time, ranging from 1 to 30 minutes, depending somewhat upon the temperature of drying.

It will be appreciated that a wide variety of systems may be employed in the impregnation of bundles of glass fibers with the composition of Example 4. For example, it is possible to employ roller-applicators, doctor blades, slotted rolls as well as a wide variety of other means known to those skilled in the art.

Suitable resorcinol aldehyde resins and combinations thereof with natural rubber latex are marketed by the U.S. Rubber Company under the trade name "Lotol." For the preparation of such materials, reference can be made to Canadian Pat. No. 435,754 wherein description is made of the reaction of resorcinol and formaldehyde in the presence of a substantial amount of short-chained alkylamines for the purpose of stabilizing the reaction and the products formed therefrom, as well as a description of the combination of the formed resin with rubber latex.

It will be understood that a wide variety of thickening agents may be employed in place of the carboxylmethyl cellulose exemplified in Example 4 to provide a thixotropic impregnant composition in accordance with the present invention. Rperesentative thickening agents include ethylene oxide condensates having a high molecular weight up to an average weight of about 20,000, and preferably a molecular weight within the range of 10,000–20,000, sodium alginate which is marketed under the trade name of "Kelgin," guar gum, sugars and potassium soaps as well as a variety of other thickening agents already known by those skilled in the art.

The amount of thickening agent employed is preferably within the range of 0.1 to 5% by weight based upon the content of the impregnant composition and within the range of 1–30% and preferably 5–20% by weight based upon the solids present in the impregnant composition. The impregnant composition is generally formulated to contain the elastomer compatible impregnane in an amount to provide a solids content within the range of 20–45% by weight. The resulting impregnant composition is applied to the glass fiber bundle in an amount to deposit therein dry solids constituting 5–30% by weight of the glass fiber system.

The use of other thickening agents in accordance with the invention may be illustrated by the following examples.

EXAMPLES 5

Impregnating composition

| | Percent |
|---|---|
| Natural rubber latex-resorcinol formaldehyde resin (38% solids-"Lotol") | 25.0 |
| Ethylene oxide condensate (average molecular weight of 14,000) | 5.0 |
| Water | 57.0 |

EXAMPLE 6

Impregnating composition

| | Percent |
|---|---|
| Natural rubber latex-resorcinol formaldehyde resin (38% solids-"Lotol") | 35.0 |
| Sodium alginate ("Kelgin") | 8.0 |
| Water | 57.0 |

EXAMPLE 7

Impregnating composition

| | Percent |
|---|---|
| Natural rubber latex-resorcinol formaldehyde resin (38% solids-"Lotol") | 30.0 |
| Guar gum | 5.0 |
| Water | 65.0 |

It will also be understood that other elastomer compatible impregnants which are employed in a basic system may be used in place of the RFL employed in the foregoing examples. One such suitable system is a vinyl pyridine-butadiene-styrene terpolymer composition of the type disclosed in U.S. Pat. No. 3,424,608, which can be formulated in accordance with the following example:

EXAMPLE 8

| Impregnating composition: | Parts by wt. |
|---|---|
| Resorcinol formaldehyde resin | 2–10 |
| Formaldehyde (37% solution) | 1–3 |
| Concentrated ammonium hydroxide | 2–5 |
| Vinyl pyridine-butadiene-styrene terpolymer (42% solids) | 15–50 |
| Neoprene rubber latex (50% solids) | 25–50 |
| Butadiene latex (60% solids) | 5–15 |
| Alkali metal hydroxide | .05–0.2 |
| Carboxymethyl cellulose | 1–15 |

Water is incorporated with the foregoing materials in amounts to produce an impregnant composition having a solids content within the range of 10–50% by weight. Introduction should be made in an amount to impregnant with dry solids containing 5–30% by weight of the glass fiber system, and preferably 10–20% by weight.

It will be understood that the vinyl pyridine-butadiene-styrene terpolymer utilized in the composition of Example 8 may be used alone as an elastomer compatible impregnant to which a thickening agent has been added, as will be illustrated by the following example.

EXAMPLE 9

| | Percent by wt. |
|---|---|
| Vinyl pyridine-butadiene-styrene terpolymer (42% solids-"Pliolite" Goodyear Chemical Co.) | 28.0 |
| Carboxymethyl cellulose | 5.0 |
| Water | 67.0 |

In accordance with another embodiment of the invention, the thickening agent may be a silyl quaternary ammonium compound as illustrated by the following examples:

EXAMPLE 10

A quaternary ammonium salt is prepared by reacting vinyl triethoxy silane with tetramethyl ammonium hydroxide in a molar ratio of about 1:1 in a solution of methanol and water at room temperature.

The salt is then formulated into the following impregnant composition:

Impregnating composition

| | Percent |
|---|---|
| Natural rubber latex-resorcinol formaldehyde resin (38% solids-"Lotol") | 30.0 |
| Quaternary salt | 3.0 |
| Water | 67.0 |

The foregoing composition is applied to a bundle of glass fibers which may or may not contain a size coating thereon in an amount to deposite dry solids constituting 5–30% by weight of the glass fiber system by conventional means, such as by the method described above with reference to FIG. 2 with care being taken to insure sufficient agitation to maintain the composition in a flowable condition.

The thixotropic impregnant gels as the glass fiber bundle is raised from the impregnating bath. However, it has been found that the gelling of the impregnant can be accelerated by subjecting the glass fiber bundle, after impregnation but prior to drying, to a lower alkanol, such as isopropanol or isobutanol. This may be conveniently accomplished by any of a wide variety of means, such as by spraying the impregnated bundle with the alcohol or by passing the bundle through an alcohol bath.

The use of the quarternary salt in Example 10 has numerous advantages in that it has been found that such salts cause basic elastomer compatible impregnant systems, such as RFL to become thixotropic and thereby be capable of gelling. In addition, the use of a silane quaternary ammonium salt provides a silane system which is compatible with a basic RFL system whereby the silane component is solubilized in the gel systems. Heretofore, attempts to add an organo silane to a basic RFL system have met with limited success due to the tendency of the silane to precipitate from the impregnant composition at higher concentrations of the silane. It is generally preferred that the quaternary salt be added in an amount constituting between 0.1 to 5% by weight of the impregnant composition.

It will be understood that other quaternary salts may be employed in place of the specific salt illustrated in Example 10. Quaternary salts contemplated for use in the present invention are those prepared by the reaction of any tetra-organo ammonium hydroxide with any organo silane. The reaction may be conveniently carried out in an aqueous, alcoholic or aqueous-alcoholic solution in the manner shown by U.S. Pat. No. 2,762,717. It is generally preferred that between .01 and 10 parts by weight of the tetra-organo ammonium hydroxide be reacted with each part by weight of the silane.

Preferred tetra-organo ammonium hydroxides are those having the general formula:

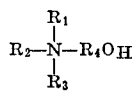

wherein $R_1$, $R_2$, $R_3$ and $R_4$ are each selected from the group consisting of alkyl having 1–12 carbon atoms, such as methyl, ethyl, propyl, etc.; alkenyl having 1–12 carbon atoms, such as vinyl, allyl, etc.; cycloalkyl having 4–8 carbon atoms, such as cyclobutyl, cyclopentyl, cyclohexyl, etc.; aryl having 6–12 carbon atoms, such as phenyl, naphthyl, etc.; and aralkyl having 6–12 carbon atoms, such as benzyl, etc.; and the hydroxy-substituted derivatives of the foregoing groups. It is particularly preferred that the total number of carbon atoms in all of the R groups be less than 15 carbon atoms.

Illustrative of the foregoing are tetramethyl ammonium hydroxide, ethyl trimethyl ammonium hydroxide, trimethylcyclohexyl ammonium hydroxide, trimethyl benzyl ammonium hydroxide, tetraethanol ammonium hydroxide, trimethyl ethanolamine ammonium hydroxide as well as a variety of others.

Preferred silanes are those having the formula:

$$Z_{(4-n)}SiR_5$$

wherein Z is hydrogen or a readily hydrolyzable group, such as halogen (fluorine, chlorine, bromine or iodine) or alkoxy having 1–8 carbon atoms, such as methoxy, ethoxy, etc., and $n$ is an integer from 1 to 3, and $R_5$ is an organic group including but not limited to alkyl having 1–12 carbon atoms, such as methyl, ethyl, propyl, etc.; alkenyl having 1–12 carbon atoms, such as vinyl, allyl, etc.; cycloalkyl having 3–10 carbon atoms, such as cyclobutyl, cyclopentyl, cyclohexyl, etc.; aryl having 6–20 carbon atoms, such as phenyl, naphthyl, etc.; alkenyl carbonyloxy alkyl, such as acryloxy propyl, methacryloxy propyl, etc.; alkyl oxyalkyl having 4–20 carbon atoms such as methyloxypropyl, ethyloxypropyl, etc.; and the amino-, epoxy-, halo- or hydroxy-substituted derivatives of the foregoing. Representative of the foregoing silanes are n-propyltrichloro silane, ethyltriethoxy silane, vinyl trichloro silane, vinyl trimethoxy silane, divinyl dichloro silane, allyl triethoxy silane, beta-cyclohexylethyltrimethoxy silane, phenyltriethoxy silane, gamma-methacryloxypropyltrimethoxy silane, gamma-aminopropyltriethoxy silane, beta-aminovinyldiethoxy silane, gamma-(triethoxysilylpropylamide) propylamine, N-(gamma-triethoxy silyl propyl) propylamine, beta-aminoallyltriethoxy silane, para-aminophenyltriethoxy silane, glycidoxypropyltrimethoxy silane and 3,4-epoxycyclohexylethyltrimethoxy silane.

It will be appreciated that when the various amino-substituted organo silanes mentioned herein are employed, there is a tendency for the nitrogen atom in the organo group attached to the silicon atoms to quaternize. This tendency is not a disadvantage, and is frequently advantageous in that it results in a silane which is further solubilized in the RFL gel.

Other illustrations of this concept of the invention are provided by way of the following examples.

EXAMPLE 11

A quaternary ammonium salt is prepared by reacting gamma-aminopropyltriethoxy with tetramethyl ammonium hydroxide in an aqueous solution in a weight ratio of 2 parts by weight of silane per 1 part of tetramethyl ammonium hydroxide. The salt is formulated into the following impregnating composition:

| | Percent |
|---|---|
| Natural rubber latex-resorcinol formaldehyde resin (38% solids-"Lotol") | 25.0 |
| Quaternary salt | 6.0 |
| Water | 69.0 |

EXAMPLE 12

In this example, the procedure of Example 11 is followed except that the tetra-organo ammonium compound is tetraethanolammonium hydroxide and the organo silane is phenyltriethoxy silane. The quaternary salt is then formulated into a vinyl pyridine-butadiene-styrene terpolymer system having the following composition:

| | Parts by wt. |
|---|---|
| Resorcinol formaldehyde resin | 2-10 |
| Formaldehyde (37% solution) | 1-3 |
| Concentrated ammonium hydroxide | 2-5 |
| Vinyl pyridine terpolymer (42% solids) | 15-50 |
| Neoprene rubber latex (50% solids) | 25-50 |
| Butadiene latex (60% solids) | 5-15 |
| Alkali metal hydroxide | .05-0.2 |
| Quaternary ammonium compound | 0.1-5 |

Water is incorporated with the foregoing materials in amounts to produce an impregnating composiiton having a minimum solids content of 10% and a maximum solids content of about 50% by weight. Introduction should be made in an amount to impregnate with a dry solids of 5-25% by weight of the glass fiber system and preferably 10-15% by weight.

It will be understood that it is similarly possible to employ one of the thickening agents utilized in Examples 1-9 in admixture with one of the silyl quaternary ammonium compounds, as illustrated by the following example.

EXAMPLE 13

| | Percent by wt. |
|---|---|
| Vinyl pyridine-butadiene-styrene terpolymer | 30.0 |
| Silyl quaternary ammonium hydroxide (formed by the reaction of allyltriethoxy silane and tetraethyl ammonium hydroxide) | 3.0 |
| Carboxymethyl cellulose | 3.0 |
| Water | 64.0 |

In accordance with yet another concept of the present invention, the thickening agent may be a quaternized amino-substituted organo silane formed by the reaction of an amino-substituted organo silane with a quaternizing agent, such as an organo-substituted acid ester. This concept of the invention may be illustrated by the following examples.

EXAMPLE 14

Gamma-aminopropyltriethoxy silane is quaternized by reacting the silane with dimethyl sulfate in a mole ratio of about 1:2 in an aqueous alcoholic solution containing silver ions to precipitate the resulting sulfate ions.

The quaternized silane is then formulated into an RFL composition as follows:

| | Percent by wt. |
|---|---|
| Natural rubber latex-resorcinol formaldehyde resin (38% solids-"Lotol") | 30.0 |
| Quaternized silane | 6.0 |
| Water | 64.0 |

The foregoing thixotropic impregnant composition is applied to a glass fiber bundle from which the originally applied size has been removed in an amount to deposit dry solids constituting 5-30% by weight of the glass fiber system, in the manner shown in Example 4 and gels as the glass fiber bundle is raised from the bath.

It will be understood that a wide variety of amino silanes may be used in place of the gamma-aminopropyltriethoxy silane exemplified in Example 14. Preferred amino silanes are generally those having the formula:

$$(R_6-NH-R_7)_n SiZ_{(4-n)}$$

wherein $R_6$ is hydrogen, and $R_7$ is a divalent organic radical including but not limited to alkylene having 1-8 carbon atoms, such as methylene, dimethylene, trimethylene, etc.; alkenylene having 2-6 carbon atoms, such as ethenylene, propenylene, etc.; or phenylene. Illustrative of suitable amines include gamma-aminopropyltriethoxy silane, gamma-aminopropyldichloro silane, beta-aminovinylallyltrichloro silane, beta-aminovinyltrimethoxy silane, gamma-aminoallyltriethoxy silane, N-(beta-aminoethyl)gamma - aminopropyltriethoxy silane, N[N'(beta-aminoethyl)beta-aminoethyl] gamma-aminopropyltriethoxy silane, p-aminophenyltrichlorosilane.

Also included within the amines contemplated for use in this embodiment are silyl alkyl amide N-substituted amines, such as N-(gamma-triethoxysilylpropylamide) propylamine as well as a variety of others.

It will similarly be understood that a variety of organo-substituted acid esters may be used in place of the dimethyl sulfate used in Example 14. The acid esters generally contemplated for use in the present invention are those having the general formula:

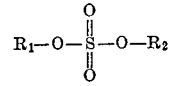

wherein $R_1$ and $R_2$ are each selected from the group consisting of alkyl having 1-6 carbon atoms, such as methyl, ethyl, propyl, etc.; cycloalkyl having 4-8 carbon atoms, such as cyclopentyl, cyclohexyl, etc.; phenylene or propylene.

The reaction is carried out in a conventional manner by reacting the amino silane with the sulfate in approximate stoichiometric proportions. The temperature conditions are not critical, and the reaction will proceed at room temperature, although the rate of reaction can be increased by heating the reaction mixture up to a temperature of about 80° C.

Other examples of this concept of the invention are as follows:

EXAMPLE 15

Beta-aminovinyltrimethoxy silane is quaternized by reaction with diethyl sulfate in the manner described in Example 14. The resulting quaternized silane is then formulated into an impregnant composition as follows.

| | Percent by wt. |
|---|---|
| Vinyl pyridine-butadienestyrene terpolymer (42% solids) | 35.0 |
| Quaternized amino silane | 4.0 |
| Water | 61.0 |

The foregoing impregnant composition may then be applied to glass fibers which may or may not contain an originally applied size in accordance with the method described in Example 4.

EXAMPLE 16

Para-aminophenyltriethoxy silane is quaternized by means of dimethyl sulfate in accordance with the method described in Example 14. The resulting quaternized silane is then formulated into the following impregnant composition.

| | Parts by wt. |
|---|---|
| Resorcinol formaldehyde resin | 2-10 |
| Formaldehyde (37% solution) | 1-3 |
| Concentrated ammonium hydroxide | 2-5 |
| Vinyl pyridine terpolymer (42% solids) | 15-50 |
| Neoprene rubber latex (50% solids) | 25-50 |
| Butadiene latex (60% solids) | 5-15 |
| Alkali metal hydroxide | .05-0.2 |
| Quaternized amino silane | .1-5 |

Water is incorporated with the foregoing materials in amounts to produce an impregnating composition having a minimum solids content of 10% and a maximum solids content of about 50% by weight. Introduction should be made in an amount to impregnate with a dry solids of 5-25% by weight of the glass fiber system and preferably 10-15% by weight.

In accordance with this concept of the invention, the quaternized amino silane is generally formulated into the impregnant composition in an amount to constitute between .1 and 5% by weight of the impregnant composition.

It will similarly be understood that the quaternized amino silane of the invention may be combined with one or more of the thickening agents utilized in Examples 1–9 to provide a thixotropic impregnant composition, as illustrated by the following example.

EXAMPLE 17

The quaternized amino silane utilized in Example 16 is formulated with carboxymethyl cellulose into an RFL impregnant composition as follows:

| | Percent |
|---|---|
| Natural rubber latex-resorcinol formaldehyde resin (38% solids-"Lotol") | 30.0 |
| Carboxymethyl cellulose | 2.0 |
| Quaternized amino silane | 3.1 |
| Water | 64.9 |

It is desirable to achieve as full impregnation as possible into the bundles of the glass fibers in order more effectively to separate the fibers one from the other by the impregnating materials since the solids are effective as a coating on the sized glass fibers to cushion the fibers and to protect the fibers against destruction by mutual abrasion. Thus it is desirable to achieve as deep penetration as possible with the impregnating composition into the glass fiber bundle. The deeper the penetration, the more effective will be the bond between the glass fibers in the bundle and the elastomeric material with which the bundles of glass fibers are combined in the subsequent manufacture of the glass fiber-elastomeric product.

In the final system, the elastomeric material with which the glass fibers are combined will constitute a continuous phase. Such continuous phase of elastomeric material may comprise rubbers of the type incorporated into the impregnating composition or the elastomeric material can differ therefrom. The continuous phase of elastomeric material can be employed in the cured or uncured state or in the vulcanized or unvulcanized state. It is believed that the tie-in between the impregnated bundles of glass fibers and the elastomeric material forming the continuous phase will occur primarily during cure or vulcanization of the elastomeric material during the fabrication of the elastomeric material.

More complete protection for the individual glass fibers and a fuller coordination with the elastomer material in the continuous phase can be achieved when the impregnating compositions of Examples 4–17 are modified for treatment of the glass fibers as a size composition which can be applied to the individual glass fibers as they are formed, as illustrated in FIG. 1 of the drawing, or afterwards if the original size is removed. For this purpose, the impregnating composition of this invention should be formulated to include an anchoring agent, such as gamma-aminopropyltriethoxy silane. Instead of gamma-aminopropyltriethoxy silane, in the size or in the impregnating composition, use can be made of other organo silicon compounds in which the organic group attached to the silicon atom contains an amino group, such as gamma-aminovinyldiethoxy silane, gamma(triethoxysilylpropyl)propylamine, beta-aminoallyltriethoxy silane, N(gamma-triethoxysilylpropyl)propylamine, and para-aminophenyltriethoxy silane. Use can be made of other organo silicon compounds in the form of a silane, silanol or polysiloxane in which the organic group attached to the silicon atom contains an epoxy group, such as glycyloxypropyltrimethoxy silane or 3,4-epoxycyclohexylethyltrimethoxy silane. Instead of the organo silicon compounds, use can be made of a Werner complex compound in which the carboxylato group coordinated with the trivalent nuclear chromium atom contains an amino group or an epoxy group such as aminopropylato chromic chloride, glycine chromic complex, B-alanine chromic complex, or glycylate chromic chloride.

A forming size embodying the further concepts of this invention can be formulated as follows:

EXAMPLE 18

| | Parts by wt. |
|---|---|
| Natural rubber latex-resorcinol formaldehyde resin (38% solids-"Lotol") | 15–50 |
| Carboxymethyl cellulose | .1–10 |
| Gamma-aminopropyldiethoxy silane | 0.1–3.0 |

To the foregoing, water is added to form an aqueous dispersion in order to provide for a solids content within the range of 20–45% by weight. Application should be made in an amount to deposit dry solids constituting 7–25% by weight of the sized glass fibers.

EXAMPLE 19

| | Parts by wt. |
|---|---|
| Natural rubber latex-resorcinol formaldehyde resin (38% solids-"Lotol") | 15–50 |
| Sodium alginate | .1–10 |
| Amino propylato chromic chloride | 0.1–3.0 |

EXAMPLE 20

| | Parts by wt. |
|---|---|
| Vinyl pyridine-butadiene-styrene terpolymer (42% solids) | 15–50 |
| Quaternary silyl ammonium hydroxide | .1–5 |
| Anchoring agent | 0.1–3 |

EXAMPLE 21

| | Parts by wt. |
|---|---|
| Vinyl pyridine-butadiene-styrene terpolymer (42% solids | 15–50 |
| Quaternary silyl ammonium hydroxide | .1–5 |
| Anchoring agent | 0.1–3 |
| Carboxymethyl cellulose | .1–10 |

EXAMPLE 22

| | Parts by wt. |
|---|---|
| Natural rubber latex-resorcinol formaldehyde resin (38% solids-"Lotol") | 15–50 |
| Quaternized amino silane | .1–5 |
| Gamma-aminopropyltriethoxy silane | .1–3 |

EXAMPLE 23

| | Parts by wt. |
|---|---|
| Natural rubber latex-resorcinol formaldehyde resin (38% solids-"Lotol") | 15–50 |
| Quaternized amino silane | .1–5 |
| Anchoring agent | .1–3 |
| Carboxymethyl cellulose | 1–10 |

In the size compositions of Examples 18–23, the anchoring agent can be employed in an amount within the range of 0.1–3.0% by weight of the size composition and preferably 0.1 to 1.0% by weight.

When the glass fibers are sized in forming with a composition embodying the features of this invention, the sized fibers can be processed directly into sized yarns, strands, cords or fabrics, or used alone in combination with elastomeric materials without the need for impregnation of the bundles of glass fibers since individual fibers 16 of the bundle are already provided with a coating 50 (FIG. 3) formulated to contain the desired components for anchoring the elastomeric material and for protecting the glass fibers to enhance their processing and their performance characteristics.

In fabricating the combinations of the glass fibers treated in accordance with the practice of this invention, with elastomeric materials, the glass fibers or bundles of glass fibers are mixed with elastomeric material or otherwise laid down in the desired arrangement for combination with the elastomeric material as in the manufacture of glass fiber reinforced belts or in the manufacture of rubber tires reinforced with cords of glass fibers. The combination of glass fibers and elastomeric material are processed in a conventional manner by molding or cure under heat and compression or by vulcanization for advancement of the elastomeric material to a cured or vulcanized stage while in combination with the treated glass fibers whereby the glass fibers or bundles of glass fibers become strongly integrated with the elastomeric material in the glass fiber-elastomeric product.

It will be understood that the size composition, represented by Examples 18–23, may also be employed as impregnating compositions, preferably with lesser dilution with aqueous medium, since the anchoring agent embodied in the size composition will continue to operate as an anchoring agent further to facilitate the bonding relationship or integration between the elastomeric material of the continuous phase and the treated glass fibers.

It will be apparent that we have provided a new and improved composition for use in the treatment of glass fibers and bundles of glass fibers to enhance their integration with elastomeric materials in the manufacture of glass fiber-elastomeric products.

We claim:

1. A glass fiber bundle comprising a plurality of individual glass fibers and an impregnant in the bundle, said impregnant comprising an elastomer compatible material selected from the group consisting of a mixture of a resorcinol-aldehyde resin blended with at least one elastomer and a vinyl pyridine-butadiene-styrene terpolymer, and a thickening agent in the form of a quaternized silane prepared by reaction of a disulfate salt and an amino-substituted organo silane.

2. A glass fiber bundle as defined in claim 1 wherein said thickening agent constitutes 0.1 to 10% by weight of the composition.

3. A glass fiber bundle as defined in claim 1 wherein said elastomer compatible material is a vinyl pyridine-butadiene-styrene terpolymer.

4. A glass fiber bundle as defined in claim 1 wherein said disulfate salt has the formula:

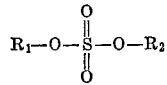

wherein $R_1$ and $R_2$ are each selected from the group consisting of alkyl, alkenyl, cycloalkyl, phenyl and benzyl.

5. A glass fiber bundle as defined in claim 1 wherein the individual glass fibers forming the bundle have a thin size coating on the surfaces thereof.

References Cited

UNITED STATES PATENTS

| | | | |
|---|---|---|---|
| 2,762,717 | 9/1956 | Clark | 117—126 GS |
| 2,958,114 | 11/1960 | Marzocchi et al. | 117—126 GB |
| 3,424,608 | 1/1969 | Marzocchi et al. | 117—77 |
| 3,462,254 | 8/1969 | Marzocchi et al. | 117—126 GB |
| 3,551,186 | 12/1970 | Martin et al. | 117—126 GB |

DANIEL J. FRITSCH, Primary Examiner

U.S. Cl. X.R.

117—126 GQ, 126 GR, 161 L, 161 UZ; 161—193, 198, 203; 260—7, 8, 14, 17 R, 29.3, 29.7, 29.2 M